B. E. WIGLESWORTH.
GRAIN SEPARATOR.
APPLICATION FILED APR. 13, 1916.

1,263,980.

Patented Apr. 23, 1918.
2 SHEETS—SHEET 1.

Witness
Herbert M. Campbell

Inventor
Berkeley E. Wiglesworth
By Shepherd & Campbell
Attorney

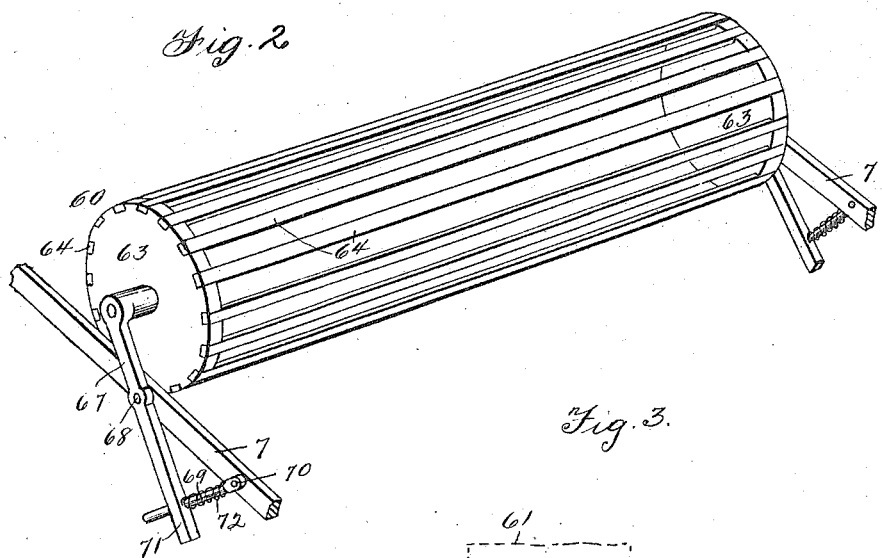
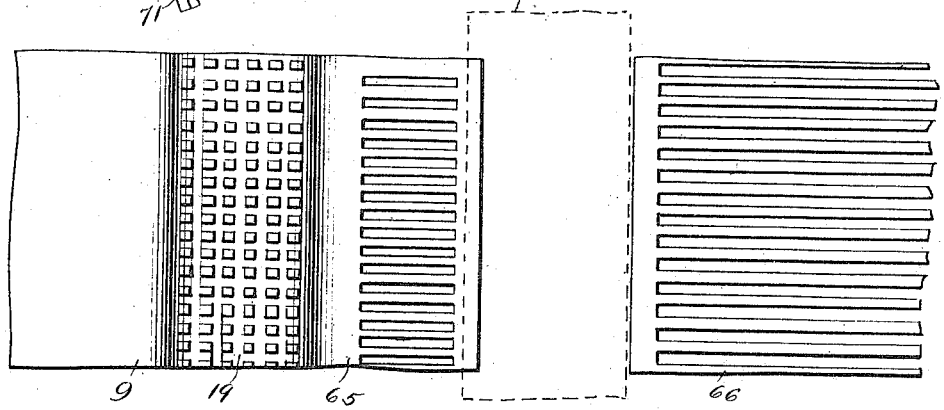
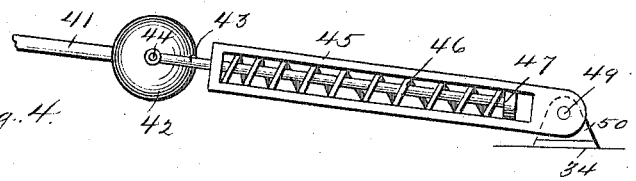

UNITED STATES PATENT OFFICE.

BERKLEY E. WIGLESWORTH, OF MARYE, VIRGINIA.

GRAIN-SEPARATOR.

1,263,980.  Specification of Letters Patent.  Patented Apr. 23, 1918.

Application filed April 13, 1916. Serial No. 90,877.

*To all whom it may concern:*

Be it known that I, BERKLEY E. WIGLESWORTH, a citizen of the United States, residing at Marye, in the county of Spottsylvania and State of Virginia, have invented certain new and useful Improvements in Grain-Separators, of which the following is a specification.

This invention relates to a combined grain separator and straw baler and it has for its object the provision of a device of this character constructed in such manner that the straw baler will be operated in unison with the grain separator, the straw will be delivered directly from the separator to the baler, the separated grain will be thoroughly cleaned and the chaff removed therefrom and the chaff will be delivered into the baler with the straw so that the straw and the chaff will be baled together.

It is a further object of the invention to provide a grain separator comprising a plurality of slatted rollers in conjunction with grates and constituting substantially flails which exercise a further threshing function upon the grain after it leaves the usual cylinder and concave.

Further objects and advantages of the invention will be set forth in the detailed description which now follows.

In the accompanying drawing:—

Fig. 2 is a perspective view of one of the slatted rollers and the mounting therefor.

Fig. 3 is a plan view illustrating the grates employed in conjunction with the slatted rollers, and, Fig. 4 is a detail view of a spring element for returning the feeding arm of the baler.

Like numerals designate corresponding parts in all of the figures of the drawings.

Figure 1:
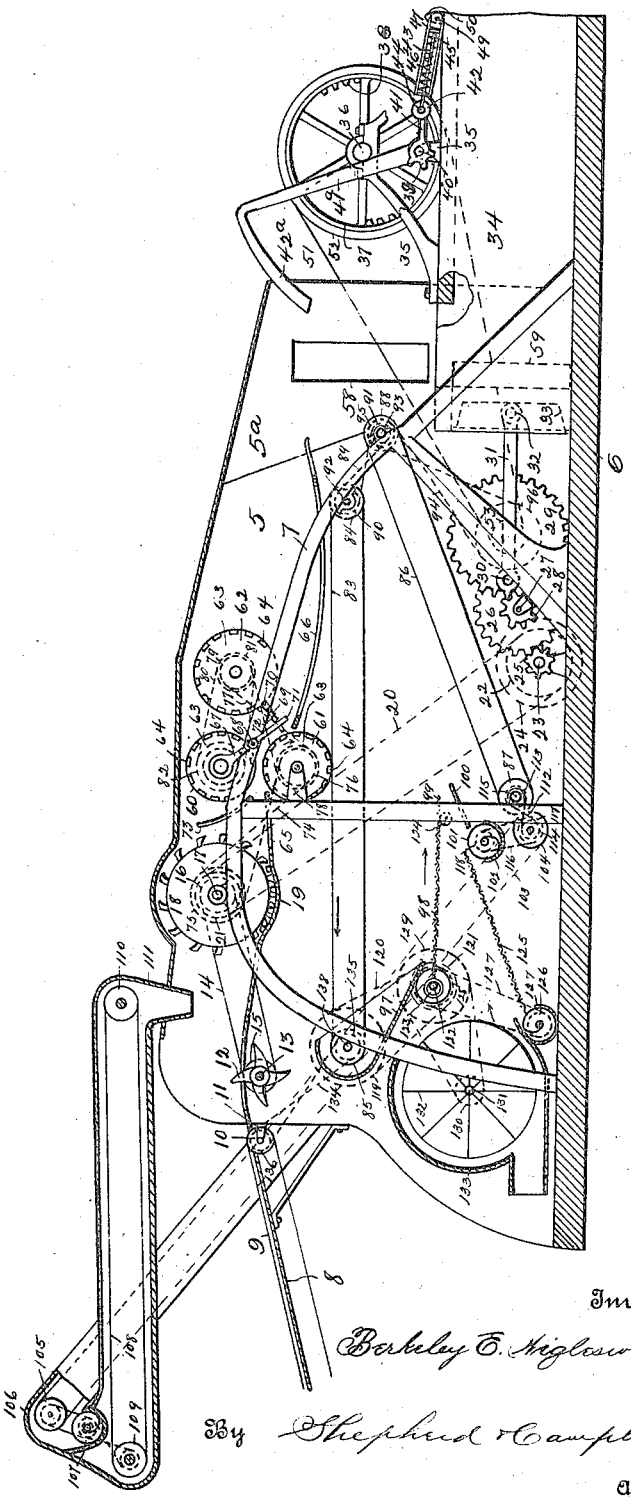
Figure 1 is a view of a grain separator constructed in accordance with the invention with one of the side walls of the box or casing removed and with certain of the parts in section.

Referring to the drawing, the numeral 5 designates the usual inclosing casing of the separator and 6 the bottom or base thereof. Mounted within the casing 5 is a frame work 7. The feeding table 8 is located at the front end of the separator and a traveling belt 9 constituting a carrier passes over a driven roller 10, the shaft of which is mounted in bearings 11 only one of which is shown. A band cutter 12 is mounted upon a shaft 13 beneath the table and is driven by a belt 14 and pulleys 15 and 16 from the shaft 17 of the cylinder 18. This cylinder acts in conjunction with the usual concave 19 in the usual and well known manner and said cylinder is driven by a belt 20 and pulleys 21 and 22 from a shaft 23. This shaft carries the main driving pulley 24 through which power is applied to all of the mechanism contained within the separator and baler. Shaft 23 carries a pinion 25 which meshes with the gear wheel 26 upon shaft 27. Shaft 27 carries a pinion 28 which meshes with the gear wheel 29. This gear wheel carries a wrist pin 30 to which one end of the connecting rod 31 is pivoted. The opposite end of this connecting rod is pivoted at 32 to the usual plunger 33 of a baler which comprises the baling box 34. Mounted in bearings 35 carried by the baler box is a shaft 36. This shaft carries a segmental gear wheel 37 provided at desired intervals with teeth 38 which act intermittently upon teeth 39 of a shaft 40. Secured to this shaft is a feeder arm 41ª, the curved free end 42ª of which swings downwardly into the baler box to pack the straw in front of the plunger in a manner which will be readily understood. Projecting rearwardly from shaft 40 is an arm 41 which carries a weight 42. A rod 43 is pivoted to this weight at 44 and is slidably mounted within a yoke 45. A spring 46 bears between the head 47 of this rod and the front end of the yoke. The opposite end of the yoke is pivoted at 49 upon an ear 50 carried by the top of the baler box. A chain or belt 51, as desired, passes over a pulley 52 which is formed with the segmental gear 37 and serves to impart movement to said segmental gear from a pulley 53 carried by gear 29. Formed in the side walls of the casing 5 are openings 58 through which the usual blocks 59 may be inserted when desired, these being the blocks that are commonly employed in balers to back up the ends of the bales of straw. Slatted rollers 60, 61 and 62 which comprise end disks 63 and slats 64 are mounted as illustrated in Fig. 1 to coöperate with grates 65 and 66. The grain as it passes over these grates and through these slatted rollers is subjected to a threshing action much like that of a flail. The slatted roller 60 is mounted in arms 67 which are pivoted at 68 to the frame 7. Rods 69 are pivoted at 70 to the frame 7 and pass through the tail ends 71 of the rods 67. Springs 72 bear between portions of these rods 69 and the tail ends 71 of rods 67 and normally tend to elevate the slatted roller 60. By virtue of this construction a floating mounting for this slatted roller is provided which aids in permitting the ready entry of the grain therebeneath. If found to be desirable, a baffle plate 73 may be employed to further aid in preventing the passage of too great a quantity of straw beneath roller 60 at one time. Roller 61, it will be noted, is journaled beneath the grates, while rollers 60 and 62 lie above the grates. Motion is imparted to roller 61 in the direction of the arrow thereon by a crossed belt 74 and pulleys 75 and 76. Motion is imparted to roller 62 from roller 61 by means of a crossed belt 77 and pulleys 78 and 79. Motion is imparted to roller 60 from roller 62 by means of belt 80 and pulleys 81 and 82. The peripheries of rollers 60 and 61 are comparatively closer together, much closer than the distance from the periphery of roller 62 to grate 66 but roller 62 is not only larger in diameter but the size of the pulley is such that its speed is greater than the speed of roller 61. The action upon the straw as it passes between rollers 60 and 61 is a beating action, while the action upon the straw as it passes roller 62 is not only a beating but is also a rubbing action due to the increased peripheral speed of this roller. Consequently, the grain is very thoroughly separated from the straw. An endless belt or conveyer 83 passes over rollers 84 and 85 and extends longitudinally beneath the grates. An endless elevator or conveyer 86 passes over rollers 87 and 88 and constitutes a chaff elevator. The conveyer 83 is driven by means of a crossed belt 89 and pulleys 90 and 91, mounted upon the shafts 92 and 93 of rollers 84 and 88 respectively. The shaft 93 is in turn driven by a crossed belt 94 and pulleys 95 and 96 from the gear wheel 29. A deflector plate 97 is arranged at the front end of the conveyer 83 and its discharge end overlies a screen 98. This screen has its discharge end 99 disposed over a deflector plate 100 the discharge end of which is located above an auger 101 which operates in a trough 102 to feed the tailings laterally through the side wall of the casing 5 and upon a tailing elevator comprising an endless belt 103 and rollers 104 and 105 by which the tailings are elevated to a point within the housing 106 where they are discharged upon auger 107 which carries them laterally far enough to discharge them upon a second conveyer 108 which passes over rollers 109 and 110. A spout 111 directs the tailings as they fall over the last named roller to a point where they will be again fed beneath the cylinder 18 and the threshing operation will be entirely completed. Roller 104 is driven by a crossed belt 112 and pulleys 113 and 114 from the shaft 115 of roller 87 while the auger 101 is driven by a belt 116 and pulleys 117 and 118 from the shaft of roller 104. A pulley 119 drives through a belt 120 to a pulley 121 on shaft 122. This shaft carries an eccentric 123 through which a shaking movement may be imparted to screen 98 and, if desired, the rear end of this screen may be mounted upon a roller 124 carried by frame 7. A fixed screen 125 is located beneath the screen 98 and its discharge end overlies a grain auger 126 which operates in a trough 127 and this grain auger discharges the cleaned grain ready to be sacked laterally and the auger 126 is driven by a belt 127 from a pulley 128 on shaft 122. This shaft 122 likewise carries a pulley 129 which drives a pulley 130 on shaft 131 of a fan 132. This fan is mounted in a casing 133 and the blast from said fan is directed upwardly and rearwardly between the screens 98 and 125. A crossed belt 134 and pulleys 135 and 136 provide means for driving the shaft of roller 10 from shaft 138 of roller 85.

*Operation.*

The grain is fed into the machine over table 8, the feeding action being aided by the endless carrier 9. The band cutter 12 severs the bands and the grain is fed between the cylinder and concave in the usual and well known manner. After being subjected to the usual threshing action at this point, the grain is subjected to a further threshing action by passing through the slatted rollers 60 and 61 and is then subjected to a further threshing action by passing between roller 62 and grate 66. The straw from which the grain has been threshed is discharged over the ends of the grate 66 into compartment 5ᵃ of casing 5 where the feeder 42 of the baler acts intermittently to thrust it downwardly in front of the plunger 33. This plunger slowly reciprocates under the action of the gears 25 to 29 and connecting rod 31 and bales the straw in the usual and well known manner. As the feeder of the hay baler travels downwardly to thrust the straw into the baler box 34 it will be apparent that the weight 42 will be lifted and the spring 46 will be placed under tension. After the teeth 38 move out of engagement with the teeth 39 the spring starts the feeder 41 and 42 upon its return or upward movement and toward the conclusion of such upward movement and as the action of the spring begins to weaken the weight moves into position to become effective and complete the return movement of the feeder. The threshed grain falls through the grates and is carried in the direction of the arrow "a" by the conveyer 83 and it is discharged upon deflector plate 97 and conveyed to screen 98. The bulk of the grain passes through this screen and falls upon screen 125 and is conveyed by screen 125 to grain auger 126 which is the usual discharge auger of the machine. There is, however, a certain amount of tailings or unthreshed heads of grain and the like which passes in the direction of the arrow "b" over the right hand end of screen 98 and over deflector plate 100 to auger 101, these tailings being discharged by said auger upon the elevator 103 and conducted by said elevator and its associated parts to spout 111 and discharged in front of the cylinder and concave to again undergo a threshing operation. As the grain falls from screen 98 to screen 125 the fan acts to blow the chaff therefrom and discharge said chaff upon chaff elevator 86. This elevator conveys the chaff to compartment 5ª and it falls into the baler and is baled in the straw. While the blast of air from the fan is sufficient to carry the very light chaff over upon the chaff elevator it is not sufficient to disturb the proper course of the tailings from the right hand end of screen 98.

While the elements shown and described are well adapted to serve the purposes for which they are intended, it is to be understood that the invention is not limited to the precise construction set forth but that it includes within its purview such changes as come within either the spirit or the terms of the appended claims.

Having described my invention, what I claim is:—

1. In a device of the character described, the combination with a grain separator of a baler associated therewith, means for conducting the straw from the separator to the baler and means for conducting the chaff to the baler so that the straw and the chaff may be baled together.

2. In a device of the character described, the combination with a grain separator of a baler associated therewith and arranged in such relation to the separator that the straw from the separator is discharged directly into said baler, and a chaff conveyer arranged to likewise discharge into said baler.

3. In a device of the character described, the combination with a grain separator, a baler associated therewith, a compartment coöperatively related to both the grain separator and the baler, said compartment being disposed at the discharge end of the separator and at the entrance end of the baler, feeding means for the baler operating in said compartment, means for discharging the straw from the separator into the compartment, a winnowing mechanism, and means for discharging the chaff from the separator into said winnowing mechanism, the feeding means for the baler forcing the chaff and the straw from said compartment into the baler.

4. A grain separator comprising the usual cylinder and concave, a grate extending rearwardly therefrom, slatted rollers acting in conjunction with said grate to exercise a threshing action upon the grain after the grain passes the cylinder and concave and a floating mounting for one of said slatted rollers.

5. A grain separator comprising the usual cylinder and concave and a pair of slatted rollers disposed in the rear of the cylinder and concave and between which the grain passes, the slats of said rollers acting upon the straw to exercise a beating action thereupon, a grate comprising a plurality of longitudinally extending fingers disposed in the rear of said rollers and a slatted roller acting in conjunction with the grate to exercise a further threshing action upon the grain.

6. A grain separator comprising the usual cylinder and concave and a pair of slatted rollers disposed in the rear of the cylinder and concave and between which the grain passes, the slats of said rollers acting upon the straw to exercise a beating action thereupon, a grate disposed in the rear of said rollers and an additional slatted roller disposed above said grate and rotative at a higher rate of speed than the first named rollers whereby the last named slatted rollers exercise a rubbing action upon the grain against said grate.

7. In a device of the character described the combination with an inclosing casing, of cylinder and concave mounted therein, a conveyer disposed beneath the cylinder and concave and conducting the grain discharged from the cylinder and concave toward the entrance end of the apparatus, a second conveyer disposed beneath the first conveyer and traveling in the opposite direction, a fan, the blast of which is directed between said conveyers, a chamber located at the rear end of the apparatus, means for conducting the straw from the cylinder and concave to said chamber, the last named conveyer likewise discharging into said chamber and serving to convey chaff to said chamber, a baler the entrance end of which is disposed within said chamber and receives the chaff and straw, said baler comprising a feeder arm operating in the chamber, and serving to force the straw and chaff from said chamber into the entrance end of the baler and means for driving the baler from a moving part of the separator.

In testimony whereof I affix my signature in presence of two witnesses.

BERKLEY E. WIGLESWORTH.

Witnesses:
WM. M. R. HARRIS,
C. W. HECHLER.

Copies of this patent may be obtained for five cents each, by addressing the "Commissioner of Patents, Washington, D. C."